(12) United States Patent
Mori

(10) Patent No.: US 11,366,623 B2
(45) Date of Patent: Jun. 21, 2022

(54) REGISTRATION OF SETTING DATA IN AN IMAGE FORMING APPARATUS

(71) Applicant: BROTHER KOGYO KABUSHIKI KAISHA, Nagoya (JP)

(72) Inventor: Kyohei Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/358,397

(22) Filed: Jun. 25, 2021

(65) Prior Publication Data

US 2021/0405945 A1 Dec. 30, 2021

(30) Foreign Application Priority Data

Jun. 26, 2020 (JP) .............................. JP2020-110740

(51) Int. Cl.
*G06F 3/12* (2006.01)

(52) U.S. Cl.
CPC .......... *G06F 3/1255* (2013.01); *G06F 3/1257* (2013.01); *G06F 3/1286* (2013.01); *G06F 3/1287* (2013.01); *G06F 3/1293* (2013.01)

(58) Field of Classification Search
None
See application file for complete search history.

(56) References Cited

U.S. PATENT DOCUMENTS

| 9,881,239 B2 * | 1/2018 | Katoh ................... G06F 3/1255 |
| 2008/0085133 A1 * | 4/2008 | Ishii ................... G03G 15/5075 399/83 |
| 2020/0125301 A1 | 4/2020 | Kaneda |
| 2020/0319830 A1 | 10/2020 | Kaneda et al. |

FOREIGN PATENT DOCUMENTS

| JP | 2019006099 A | 1/2019 |
| JP | 2019119089 A | 7/2019 |

* cited by examiner

*Primary Examiner* — Eric A. Rust
(74) *Attorney, Agent, or Firm* — Scully, Scott, Murphy & Presser, PC

(57) ABSTRACT

An image processing device may, in a case where an obtainment request is received from a terminal device, send to the terminal device one or more pieces of setting data stored in a setting storage area related to an image processing, in a case where a first type of changing request requesting changing of stored contents in the setting storage area is received from the terminal device, change the stored contents in the setting storage area according to the first type of changing request. In a case where a second type of changing request is received from the terminal device, changing according to the second type of changing request may be restricted, the second type of changing request being for requesting changing of the stored contents in the setting storage area.

17 Claims, 11 Drawing Sheets

FIG. 7

(Fourth Embodiment)

Preset Table 42

| Account Name | Preset Name | Setting Data | |
|---|---|---|---|
| name1 | Preset1 | D1 | ⎫ PD1 ⎬ Account Preset Data |
| name2 | Preset2 | D2 | ⎭ PD2 |
| - | Preset3 | D3 | } PD3 Shared Preset Data |
| ... | ... | ... | |

Account Table 44

| Account Name | Password |
|---|---|
| name1 | yyyy |
| name2 | zzzz |
| ... | ... |

REGISTRATION OF SETTING DATA IN AN IMAGE FORMING APPARATUS

CROSS-REFERENCE TO RELATED APPLICATION

This application claims priority to Japanese Patent Application No. 2020-110740 filed on Jun. 26, 2020, and Japanese Patent Application 2021-096611 filed on Jun. 9, 2021, the contents of which are hereby incorporated by reference into the present application.

TECHNICAL FIELD

The present disclosure discloses a technique related to an image processing device configured to store setting data.

DESCRIPTION OF RELATED ART

An image forming system including a host terminal and a printer is known. The printer can store a print preset according to the Internet Printing Protocol (IPP). When receiving an obtainment request from the host terminal, the printer sends the stored print preset to the host terminal. The host terminal displays print settings corresponding to the print preset on a print settings screen. When receiving a print preset registration request from the host terminal, the printer registers a new print preset, updates the stored print preset, or the like.

SUMMARY

The above technique does not consider restricting registration of a print preset to the printer and updating of a print preset. For this reason, for example, in the situation where an administrator of the image forming system administers the print preset in the printer, the print preset may be registered or updated contrary to the intent of the administrator.

The present disclosure provides a technique capable of restricting a change according to a changing request related to setting data.

The image processing device disclosed herein may comprise: an image processing execution unit configured to execute image processing; and a controller, wherein the controller is configured to: in a case where an obtainment request is received from a terminal device, send to the terminal device one or more pieces of setting data stored in a setting storage area for storing the one or more pieces of setting data related to the image processing; in a case where specific setting data is selected from among the one or more pieces of setting data on the terminal device after the one or more pieces of setting data have been sent to the terminal device, receive from the terminal device a process execution request including one or more setting values indicated by the specific setting data; in a case where the process execution request is received from the terminal device, cause the image processing execution unit to execute the image processing according to the one or more setting values included in the process execution request; and in a case where a first type of changing request requesting changing of stored contents in the setting storage area is received from the terminal device, change the stored contents in the setting storage area according to the first type of changing request, wherein in a case where a second type of changing request being different from the first type of changing request is received from the terminal device, changing according to the second type of changing request is restricted, the second type of changing request requesting changing of the stored contents in the setting storage area.

Another image processing device disclosed herein may comprise: an image processing execution unit configured to execute image processing; and a controller, wherein the controller is configured to: in a case where an obtainment request is received from a terminal device, send to the terminal device one or more pieces of setting data stored in a setting storage area for storing the one or more pieces of setting data related to the image processing; in a case where specific setting data is selected from among the one or more pieces of setting data on the terminal device after the one or more pieces of setting data have been sent to the terminal device, receive from the terminal device a process execution request including specific information for specifying the specific setting data; in a case where the process execution request is received from the terminal device, cause the image processing execution unit to execute the image processing according to the one or more setting values indicated by the specific setting data specified by the specific information included in the process execution request; and in a case where a first type of changing request requesting changing of stored contents in the setting storage area is received from the terminal device, change the stored contents in the setting storage area according to the first type of changing request, and send to the terminal device a restriction request requesting restriction of sending of a second type of changing request being different from the first type of changing request, the second type of changing request requesting changing of the stored contents in the setting storage area.

A method implemented by the image processing device, a computer program for the image processing device, and a non-transitory computer-readable recording medium for storing the computer program are also novel and useful.

BRIEF DESCRIPTION OF DRAWINGS

FIG. 7 illustrates tables according to a fourth embodiment;

EMBODIMENTS (First Embodiment)
(Configuration of Communication System 2; FIG. 1)
As illustrated in FIG. 1, a communication system 2 includes a printer 10, an administration terminal 100, and a user terminal 200. The printer 10 and the terminals 100 and 200 belong to the same Local Area Network (LAN) 4 and can communicate with each other via the LAN 4. The LAN 4 may be a wired LAN or a wireless LAN.

(Configuration of Terminals 100 and 200)

Figure 1:
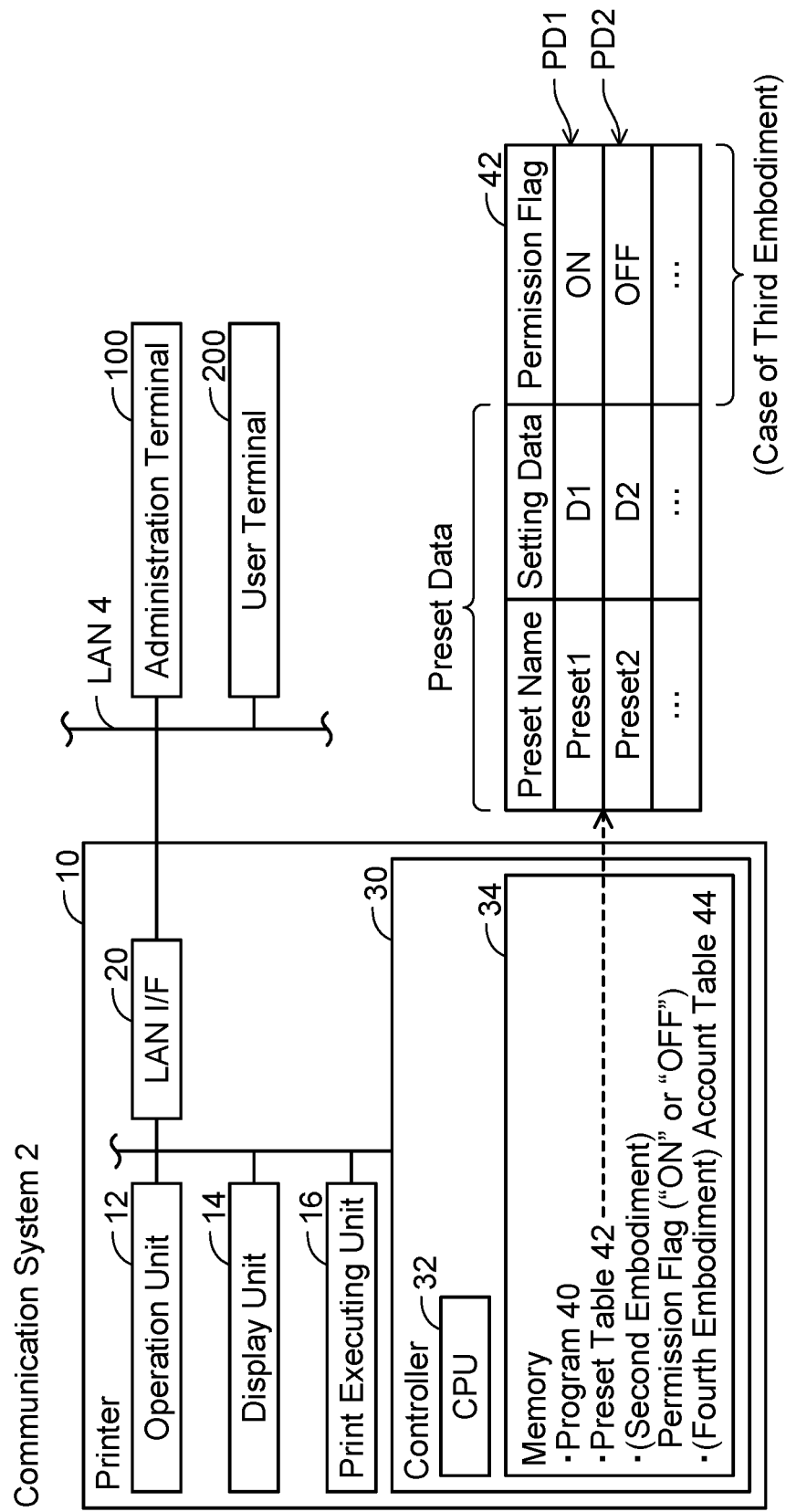
FIG. 1 illustrates a configuration of a communication system.

The administration terminal 100 is a terminal used by an administrator of the communication system 2. The administrator is a user who has the authority to change settings of the printer 10 (e.g., firmware, Internet connection settings, settings related to IPP to be described later). The user terminal 200 is a terminal used by a user (hereinafter, referred to as "general user") who does not have the authority to change the settings of the printer 10. The terminals 100 and 200 may be, for example, a desktop PC, a smart phone, a tablet PC, a notebook PC, or the like.

The terminals 100 and 200 include an Internet Printing Protocol (IPP) program (not illustrated) installed from a server on the Internet. The IPP program is a program for generating an IPP command according to the Hyper Text Transfer Protocol (HTTP) and sending the command to the printer 10. In this embodiment, the server is provided by a vender different from a vendor of the printer 10. However, in a variant, the server may be provided by the vendor of the printer 10. The terminals 100 and 200 may support IPP in advance without installing the IPP program from the server described above.

(Configuration of Printer 10)

The printer 10 is a peripheral device configured to execute a printing process (that is, a peripheral device of the terminals 100 and 200). The printer 10 is further configured to execute a web server function. The web server function is a function of, in response to an external device (for example, the administration terminal 100) accessing a web server in the printer 10, sending web page data corresponding to a web page to the external device. The web page is, for example, a page for managing the settings of the printer 10. The printer 10 may be a multi-function device configured to execute a scanning process, a FAX process, or the like, in addition to the printing process and the web server function. The printer 10 includes an operation unit 12, a display unit 14, a print execution unit 16, a LAN interface (hereinafter, the interface is referred to as "I/F") 20, and a controller 30.

The operation unit 12 includes a plurality of keys. The user can input various instructions to the printer 10 by operating the operation unit 12. The display unit 14 is a display for displaying various information. The display unit 14 also functions as a so-called touch screen (that is, an operation unit). The print execution unit 16 is a printing mechanism of an ink jet scheme, a laser scheme, or the like. The LAN I/F 20 is connected to the LAN 4.

The controller 30 includes a CPU 32, and a memory 34. The CPU 32 executes various operations according to a program 40 stored in the memory 34. The memory 34 is configured of a volatile memory, a non-volatile memory, and the like. The memory 34 further stores a preset table 42.

The preset table 42 is a table for storing one or more pieces of preset data (i.e., a storage area). The preset data includes a preset name that identifies the preset data and setting data of the preset data. The setting data includes a plurality of setting values corresponding to a plurality of setting items (e.g., number of colors, number of copies, size, surface to be printed, etc.) for executing the printing process. The setting data is described in accordance with the IPP. In the present embodiment, all the preset data in the preset table 42 is shared preset data available to any user. In a variant, all the preset data in the preset table 42 may be preset data available only to an individual user (account preset data to be described later). In another variant, the preset table 42 may store both the shared preset data and the account preset data.

Figure 2:
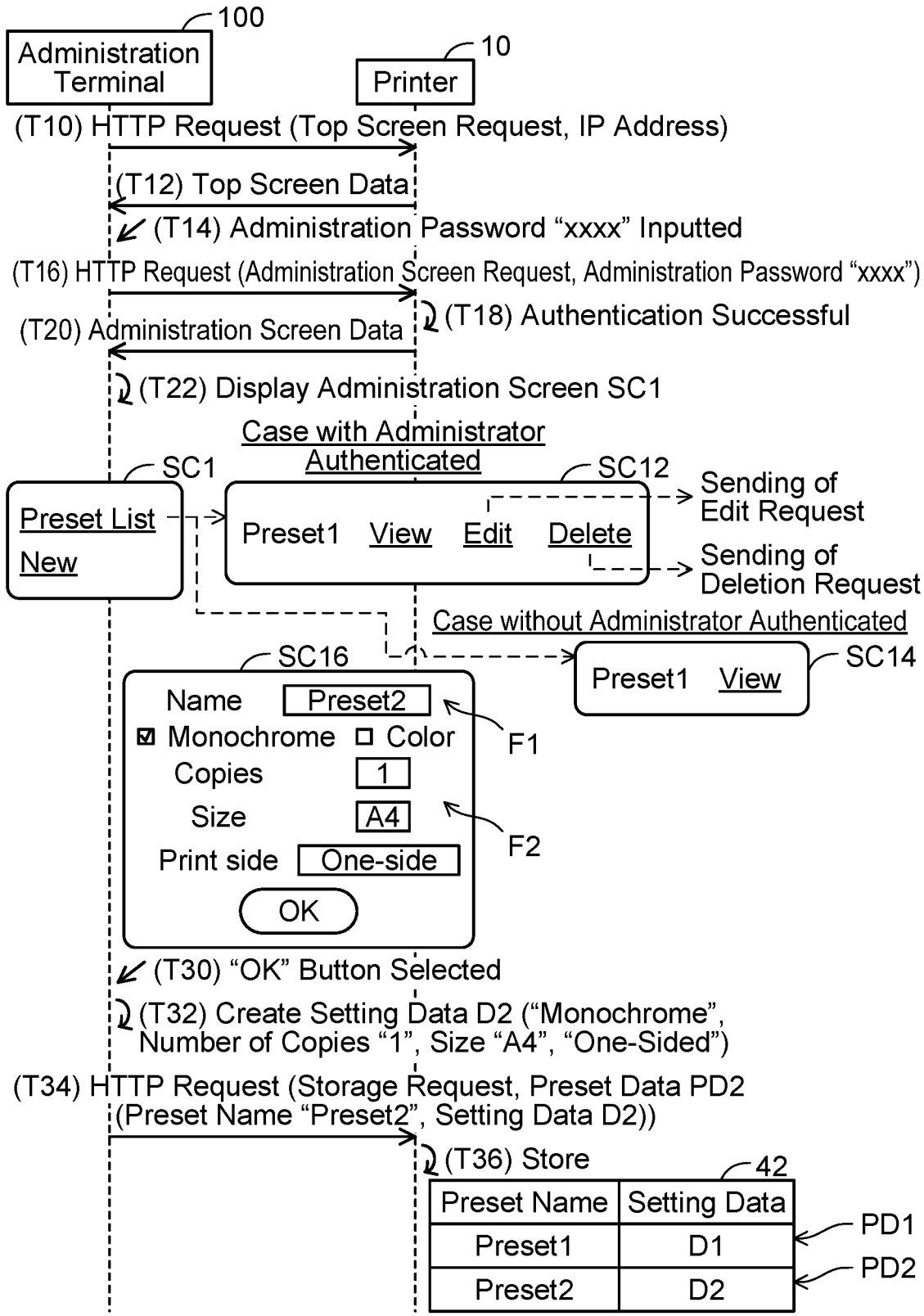
FIG. 2 illustrates a sequence diagram of a process for managing preset data.

(Process for Managing Preset Data; FIG. 2)

Referring to FIG. 2, a process for the administrator to administer the preset data in the printer 10 will be described. In the following description, unless otherwise stated, the processes executed by the CPU 32 of the printer 10 will be described with the printer 10 as the subject without describing the CPU 32 as the subject for easier understanding. In the following description, the printer 10 and the terminals 100 and 200 communicate via the LAN 4 and the LAN I/F 20. In the following description, unless otherwise stated, phrases "via the LAN 4" and "via the LAN I/F 20" will be omitted.

In T10, in response to receiving an instruction from the administrator, the administration terminal 100 sends a HTTP request including a top-screen request to the printer 10. The top screen request is a command for requesting top screen data. The top screen data is web page data corresponding to a top screen for accessing a web server within the printer 10. The HTTP request includes an IP address of the printer 10.

When receiving the HTTP request including the top screen request from the administration terminal 100 in T10, the printer 10 sends the top screen data to the administration terminal 100 in T12.

When receiving the top screen data from the printer 10 in T12, the administration terminal 100 displays the top screen. The top screen includes an input field for inputting an administration password for authenticating a user (i.e., the administrator) of the administration terminal 100. The administration terminal 100 receives input of the administration password "xxxx" in T14. The administration terminal 100 sends a HTTP request including an administration screen request and the administration password "xxxx" to the printer 10 in T16. The administration screen request is a command for requesting administration screen data. The administration screen data is web page data corresponding to an administration screen for managing the settings of the printer 10.

When receiving the HTTP request from the administration terminal 100 in T16, the printer 10 executes authentication of the administration password "xxxx" in the HTTP request in T18. In this case, the administration password "xxxx" is successfully authenticated. The printer 10 sends the administration screen data to the administration terminal 100 in T20.

When receiving the administration screen data from the printer 10 in T20, the administration terminal 100 displays an administration screen SC1 in T22. The administration screen SC1 includes a "Preset List" button and a "New" button. The "Preset List" button is a button for displaying a list of the one or more pieces of preset data stored in the preset table 42 of the printer 10.

The administration terminal 100 displays a list screen SC12 when the "Preset List" button in the administration screen SC1 is selected. The list screen SC12 includes, for each of the one or more pieces of preset data, a preset name of the preset data (e.g., "Preset1"), a "View" button for viewing the preset data, an "Edit" button for editing the preset data, and a "Delete" button for deleting the preset data.

When the "View" button corresponding to the preset name "Preset1" in the list screen SC12 is selected, the administration terminal 100 sends a HTTP request including the preset name "Preset1" to the printer 10. Thereby, the administration terminal 100 receives, from the printer 10, the setting data D1 (see FIG. 1) stored in association with the preset name "Preset 1". Then, the administration terminal 100 displays a browsing screen (not illustrated) including a character string indicating the received setting data D1.

When the "Edit" button corresponding to the preset name "Preset1" in the list screen SC12 is selected, the administration terminal 100 sends a HTTP request including the preset name "Preset1" to the printer 10 and receives the setting data D1 corresponding to the preset name "Preset1". The administration terminal 100 displays an edit screen (not illustrated) for editing the received setting data D1. Then, when receiving an instruction for editing the setting data D1 on the edit screen, the administration terminal 100 sends, to the printer 10, a HTTP request including edited setting data (for example, setting data whose value of the setting item "number of copies" is different from that of the setting data D1) and an edit request requesting edit of the setting data D1 according to the edited setting data. Thereby, the setting data D1 in the preset table 42 is changed to the edited setting data.

When the "Delete" button corresponding to the preset name "Preset1" in the list screen SC12 is selected, the administration terminal 100 sends to the printer 10 a HTTP request including a deletion request requesting deletion of the setting data D1 stored in association with the preset name "Preset1". Thereby, the setting data D1 is deleted from the preset table 42.

The administration terminal 100 displays a storage screen SC16 for storing new preset data when the "New" button in the administration screen SC1 is selected. The storage screen SC16 includes an input field F1 for inputting a preset name, an input field F2 for inputting a plurality of setting values corresponding to the plurality of setting items, and an "OK" button.

The administration terminal 100 accepts input of the preset name "Preset2" and input of the number of colors "monochrome", the number of copies "1", the size "A4", and the sides to be printed "one-sided" as the plurality of setting values in the storage screen SC16, and then accepts selection of the "OK" button in the storage screen SC16 in T30.

In T32, the managing terminal 100 creates setting data D2 including the number of colors "monochrome", the number of copies "1", the size "A4", and the sides to be printed "one-sided" inputted in the storage screen SC16.

In T34, the administration terminal 100 sends a HTTP request including a storage request and preset data PD2 to the printer 10. The preset data PD2 includes the preset name "Preset2" inputted in the storage screen SC16 and the created setting data D2. The storage request is a command requesting storage of the preset data PD2 in the preset table 42.

When receiving the HTTP request including the storage request from the administration terminal 100 in T34, the printer 10 stores the preset data PD2 included in the HTTP request in the preset table 42 in T36 in accordance with the storage request.

When not accepting the input of the administration password "xxxx" in T14, the administration terminal 100 sends a HTTP request including the administration screen request and not including the administration password "xxxx" to the printer 10. Even in this case, the administration terminal 100 displays the administration screen SC1. Then, when the "New" button in the administration screen SC1 is selected, the administration terminal 100 executes the process from T30. Consequently, the new preset data PD2 is stored in the preset table 42. That is, the new preset data PD2 is stored in the preset table 42 even when the user of the administration terminal 100 is not authenticated as an administrator. In the situation where the new preset data PD2 is to be stored, the administrator can omit the input of the administration password "xxxx". Greater convenience for the administrator can be provided. In addition, the general user may use the web server function of the printer 10 to store new preset data. In a variant, when a user of the administration terminal 100 is not authenticated as the administrator, storage of the new preset data PD2 may be restricted.

When the administration password "xxxx" is not inputted in T14 and the "Preset List" button in the administration screen SC1 is selected, the administration terminal 100 displays a list screen SC14 different from the list screen SC12 described above. The list screen SC14 includes, for each of the one or more pieces of preset data, a preset name of the preset data (e.g., "Preset1") and a "View" button for viewing the preset data, but does not include an "Edit" button for editing the preset data and a "Delete" button for deleting the preset data. Since neither of the "Edit" button nor the "Delete" button is included in the list screen SC14, sending of a HTTP request including an edit request or a deletion request to the printer 10 is restricted. As a result, edit and deletion of the preset data in the preset table 42 is restricted.

For example, a comparative example is assumed in which the list screen SC12 including the "Edit" button and the "Delete" button is displayed even though the administration password "xxxx" is not inputted. In this comparative example, a third party different from the administrator may operate the administration terminal 100 to edit or delete the preset data. When the third party edits or deletes the preset data, the preset data is edited or deleted contrary to the intent of the administrator and the general user who uses the preset data, which is less convenient for the administrator and the general user. On the other hand, in the present embodiment, when the administration password "xxxx" is not inputted, the list screen SC14 that does not include the "Edit" button and the "Delete" button is displayed, by which edit and deletion of the preset data in the preset table 42 is restricted. The preset data can be prevented from being edited or deleted by the third party different from the administrator. It is possible to prevent degradation of convenience for the administrator and the general users. In addition, since the preset data can be viewed by selecting the "View" button without inputting the administration password "xxxx", administration of the preset data by the administrator can be simplified. In a variant, the configuration of the comparative example may be employed.

Figure 3:
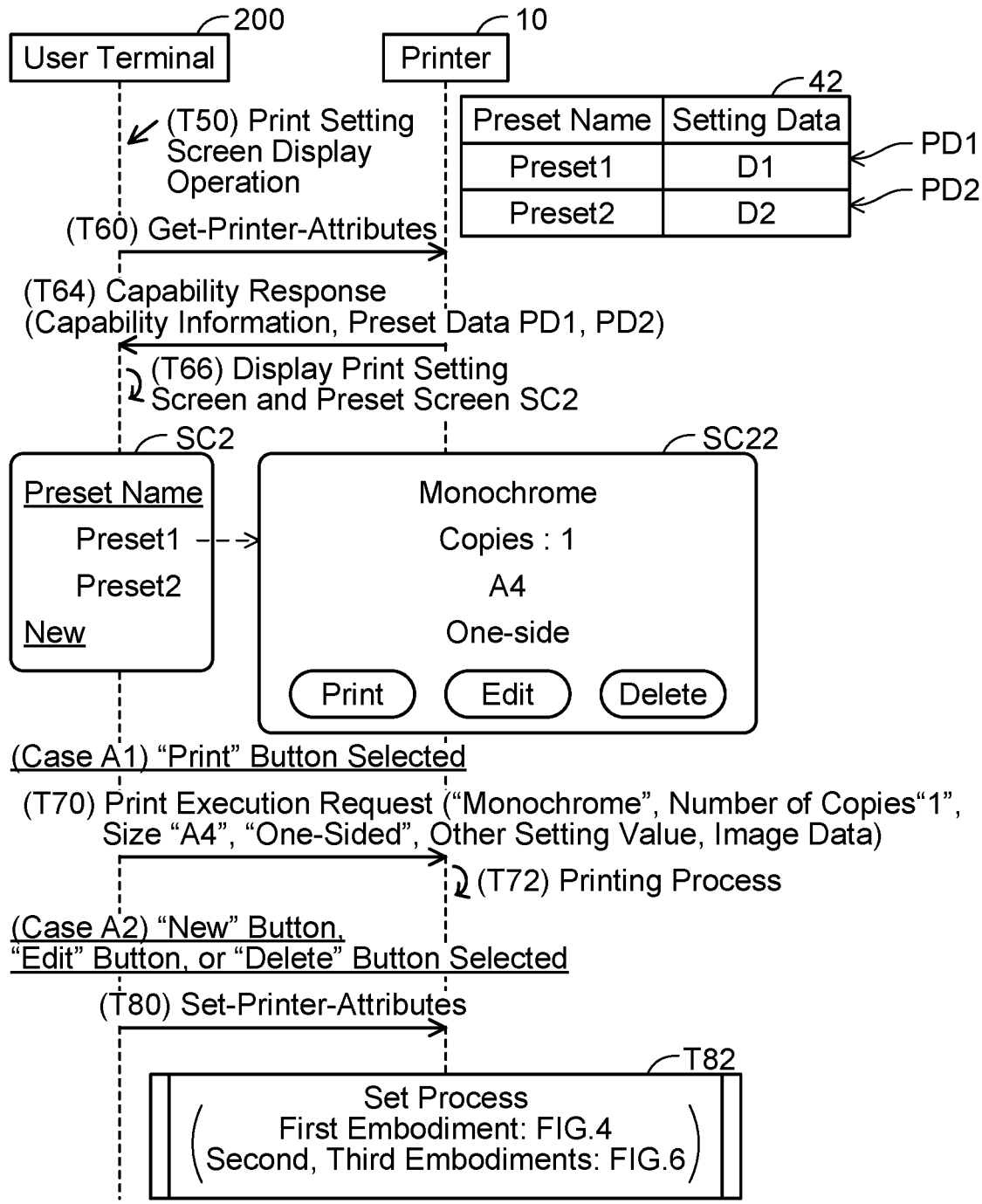
FIG. 3 illustrates a sequence diagram of a process for a user to use the preset data.

(Process for User to Use Preset Data; FIG. 3)

Referring to FIG. 3, a process for the general user to use the preset data will be described. In the initial state of FIG. 3, two pieces of preset data PD1, PD2 are stored in the preset table 42 of the printer 10. The communication for using the web server function of FIG. 2 is executed through a first port of the printer 10. In contrast, communication of FIG. 3 is executed via a second port of the printer 10, which is different from the first port. When the communication through the first port is executed, the printer 10 determines that the process of FIG. 2 is to be executed. When the communication through the second port is executed, the printer 10 determines that the process of FIG. 3 is to be executed. In a variant, the printer 10 may determine that the process of FIG. 2 is to be executed when a signal received from the terminal device does not include predetermined information, and may determine that the process of FIG. 3 is to be executed when a signal received from the terminal device includes the predetermined information. The predetermined information is, for example, information described in accordance with IPP (e.g., information in a header).

When accepting an operation to display a print setting screen for inputting the setting value of the printing process from the general user in T50, the user terminal 200 sends a Get-Printer-Attributes command in accordance with IPP (hereafter referred to as "GPA") to the printer 10 in T60. The GPA includes a capability obtainment request requesting obtainment of capability information indicating all printing conditions the printer 10 is configured to execute (e.g., "monochrome", "color", "A3", "A4", "one-sided", "double-sided with long-side margin", "double-sided with short side margin", and the like), and a data obtainment request requesting obtainment of preset data.

When receiving the GPA from the user terminal 200 in T60, the printer 10 sends to the user terminal 200 a capability response which is a response to the GPA in T64. The capability response includes the capability information and all the preset data PD1, PD2 in the preset table 42.

When receiving the capability response from the printer 10 in T64, the user terminal 200 displays a print setting screen (not illustrated) and a preset screen SC2 in T66. The print setting screen includes an input field for inputting a setting value corresponding to the capability information included in the capability response. The preset screen SC2 includes a list of preset names of the stored preset data and a "New" button for storing new preset data. At present, the list includes the preset names "Preset1" and "Preset2".

For example, when the preset name "Preset2" in the preset screen SC2 is selected, the user terminal 200 displays a print screen SC22. The print screen SC22 includes a character string indicating the setting data D2 of the preset data PD2 corresponding to the preset name "Preset2", a "Print" button, an "Edit" button, and a "Delete" button. The "Print" button is a button for accepting an instruction to execute printing. The "Edit" button is a button for accepting an instruction for editing the preset data PD2. The "Delete" button is a button for accepting an instruction for deleting the preset data PD2. Although the detail is omitted, the setting values in the print screen SC22 can be changed. In addition, in the print screen SC22, setting value(s) corresponding to setting item(s) different from the setting items indicated by the preset data PD2 (for example, image quality) can be additionally set.

Case A1 is a case in which the "Print" button in the print screen SC22 is selected. The user terminal 200 sends to the printer 10 a print execution request requesting printing of an image to be printed. The print execution request includes four setting values indicated by the preset data PD2 (i.e., number of colors "monochrome", number of copies "1", size "A4", and sides to be printed "one-sided"), and image data corresponding to the image to be printed. The print execution request further includes one or more other setting values (e.g., image quality "high") different from the four setting values indicated by the preset data PD2. Each of the one or more other setting values is, for example, a setting value additionally set by the general user, a default value of the printer 10, or the like. The default value is included, for example, in the capability response of T64. In a variant, the print execution request may not include the one or more other setting values.

The print execution request does not include the preset name "Preset2". Therefore, the printer 10 cannot know that the preset name "Preset2" has been selected in the preset screen SC2, that is, that the preset data PD2 has been used by the user terminal 200. In a variant, the print execution request may include the preset name "Preset2".

When receiving the print execution request from the user terminal 200 in T70, the printer 10 causes the print execution unit 16 to execute the printing process of the image corresponding to the image data included in the print execution request in T72 according to the plurality of setting values included in the print execution request.

Case A2 is a case in which one of the "New" button in the preset screen SC2, the "Edit" button, and the "Delete" button in the print screen SC22 is selected.

For example, when the "New" button is selected, the user terminal 200 displays the same screen as the storage screen SC16 of FIG. 2. When receiving input of a preset name and setting values on the screen, the user terminal 200 creates new preset data including the inputted information (that is, the preset name and the setting values). Then, the user terminal 200 sends a Set-Printer-Attributes command according to IPP (hereinafter, referred to as "SPA") to the printer 10 in T80. The SPA is a command that requests the printer 10 to execute at least one of storage, edit, a deletion of the preset data. When the "New" button is selected, the SPA includes the preset data PD1, PD2 received in T64 and the new created preset data. In a variant, the user terminal 200 may send to the printer 10 a first command according to IPP in the case of storage of the preset data, send to the printer 10 a second command which is different from the first command and in accordance with IPP in the case of edit of the preset data, and send to the printer 10 a third command which is different from the first and second commands and in accordance with IPP in the case of deletion of the preset data.

For example, when the "Edit" button is selected, the user terminal 200 displays an edit screen (not illustrated) for editing the setting data D2 of the preset data PD2. When receiving an instruction for editing the setting data D2 in the edit screen, the user terminal 200 creates edited preset data including the preset name "Preset2" of the preset data PD2 and edited setting data (for example, setting data in which the value of the setting item "number of copies" is different from that of the setting data D2). Then, the user terminal 200 sends the SPA including the preset data PD1 received in T64 and the edited preset data to the printer 10 in T80.

For example, when the "Delete" button is selected, the user terminal 200 sends an SPA that includes the preset data PD1 and does not include the preset data PD2 in T80.

When receiving the SPA from the user terminal 200 in T80, the printer 10 executes a Set process (see FIG. 4) in T82. When the Set process ends, the process of FIG. 3 ends.

Figure 4:
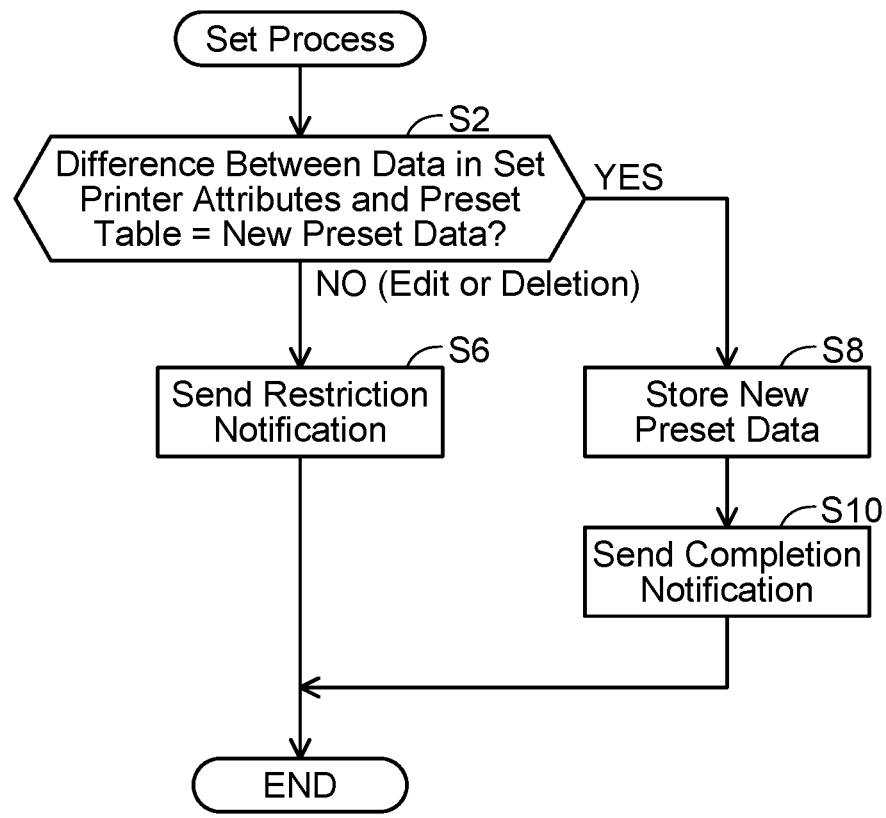
FIG. 4 illustrates a flowchart of a Set process according to a first embodiment.

(Set Process; FIG. 4)

Referring to FIG. 4, the Set process in T82 of FIG. 3 will be described. In S2, the CPU 32 of the printer 10 identifies a difference between the preset data in the SPA of T80 of FIG. 3 and the preset data in the preset table 42. The CPU 32 then determines whether the identified difference is the new preset data. For example, when the "New" button is selected in Case A2 of FIG. 3, the SPA includes the new preset data. In this case, the CPU 32 determines that the identified difference is the new preset data (YES in S2) and proceeds to S8.

In S8, the CPU 32 stores, in the preset table 42, the new preset data in the SPA. Then, in S10, the CPU 32 sends to the user terminal 200 a completion notification indicating that storage of the new preset data has been completed. Thereby, the user terminal 200 displays a message indicating that storage of the new preset data has been completed. When S10 ends, the process of FIG. 4 ends.

For example, when the "Edit" button is selected in Case A2 of FIG. 3, the identified difference is a difference between a setting value of a particular setting item of the edited preset data in the SPA and a setting value of the particular setting item of the preset data PD2 in the preset table 42. In addition, for example, when the "Delete" button is selected in Case A2 of FIG. 3, the identified difference is the SPA not including the preset data PD2. In these cases, the CPU32 determines that the identified difference is not the new preset data (NO in S2), and proceeds to S6.

In S6, the CPU 32 sends to the user terminal 200 a restriction notification indicating that selected one of the edit and deletion of the preset data is restricted without changing the stored contents in the preset table 42 based on the preset data in the SPA. Thereby, the user terminal 200 displays a message indicating that the one of the edit and deletion of the preset data has been restricted. The user can know that the one of the edit and deletion of the preset data has been restricted.

(Effects of Present Embodiment)

According to the configuration of the present embodiment, when receiving the HTTP request for using the web server function of the printer 10, the printer 10 changes the stored contents in the preset table 42 according to the storage request, the edit request, or the deletion request in the HTTP request (for example, T36 in FIG. 2). On the other hand, when receiving the SPA that is different from the HTTP request for using the web server function, the printer 10 does not execute (i.e., restricts) edit or deletion of the preset data in the preset table 42 based on the preset data in the SPA (S6 in FIG. 4). For example, a comparative example is assumed in which the Set process of FIG. 4 is not executed, and edit or deletion of the preset data in the preset table 42 is executed based on the preset data in the SPA. In this comparative example, in the situation where the administrator administers the stored contents in the preset table 42, the preset data in the preset table 42 may be edited or deleted contrary to the intent of the administrator. In contrast, in this embodiment, the edit and deletion of the preset data based on the preset data in the SPA is restricted, and the edit and deletion of the preset data in the preset table 42 contrary to the intent of the administrator can be prevented.

In this embodiment, the printer 10 stores in the preset table 42 the new preset data in the SPA based on the preset data in the SPA (S8 in FIG. 4). That is, the storage of the new preset data based on the SPA is not restricted. The general user can store the new preset data without obtaining permission to store the new preset data from the administrator. Greater convenience for the general user can be provided.

(Corresponding Relationships)

The printer 10, the print execution unit 16, and the preset table 42 are an example of "image processing device", "image processing execution unit", and "setting storage area", respectively. The administration terminal 100 or the user terminal 200 is an example of "terminal device". The GPA is an example of "obtainment request". The HTTP request in T34 of FIG. 2 is an example of "first type of changing request". The SPA is an example of "second type of changing request". The restriction notification in S6 of FIG. 4 is an example of "notification". Among the setting values included in the print execution request in T70 of FIG. 3, the four setting values indicated by the preset data PD2 are examples of "specific information".

T64, T70, T72 of FIG. 3 and T36 of FIG. 2 are an example of the process implemented by "send to the terminal device one or more pieces of setting data", "receive from the terminal device a process execution request", "cause the image processing execution unit to execute the image processing", and "change the stored contents in the setting storage area", respectively.

(Second Embodiment)

(Configuration of Printer 10; FIG. 1)

In a second embodiment, a permission flag is used. The printer 10 of the present embodiment is the same as the printer 10 of the first embodiment except that the memory 34 stores the permission flag and the contents of the Set process are different. The permission flag indicates any one of "ON" that permits edit and deletion of the preset data in the preset table 42 based on the preset data in the SPA and "OFF" that does not permit the edit or deletion of the preset data in the preset table 42 based on the preset data in the SPA. By default, the permission flag indicates "OFF". The permission flag is a flag shared by all the preset data in the preset table 42. In a variant, the printer 10 may store a first permission flag for permitting edit of the preset data in the preset table 42 and a second permission flag for permitting deletion of the preset data in the preset table 42. The printer 10 may further store a third permission flag for permitting storage of the new preset data.

Figure 5:
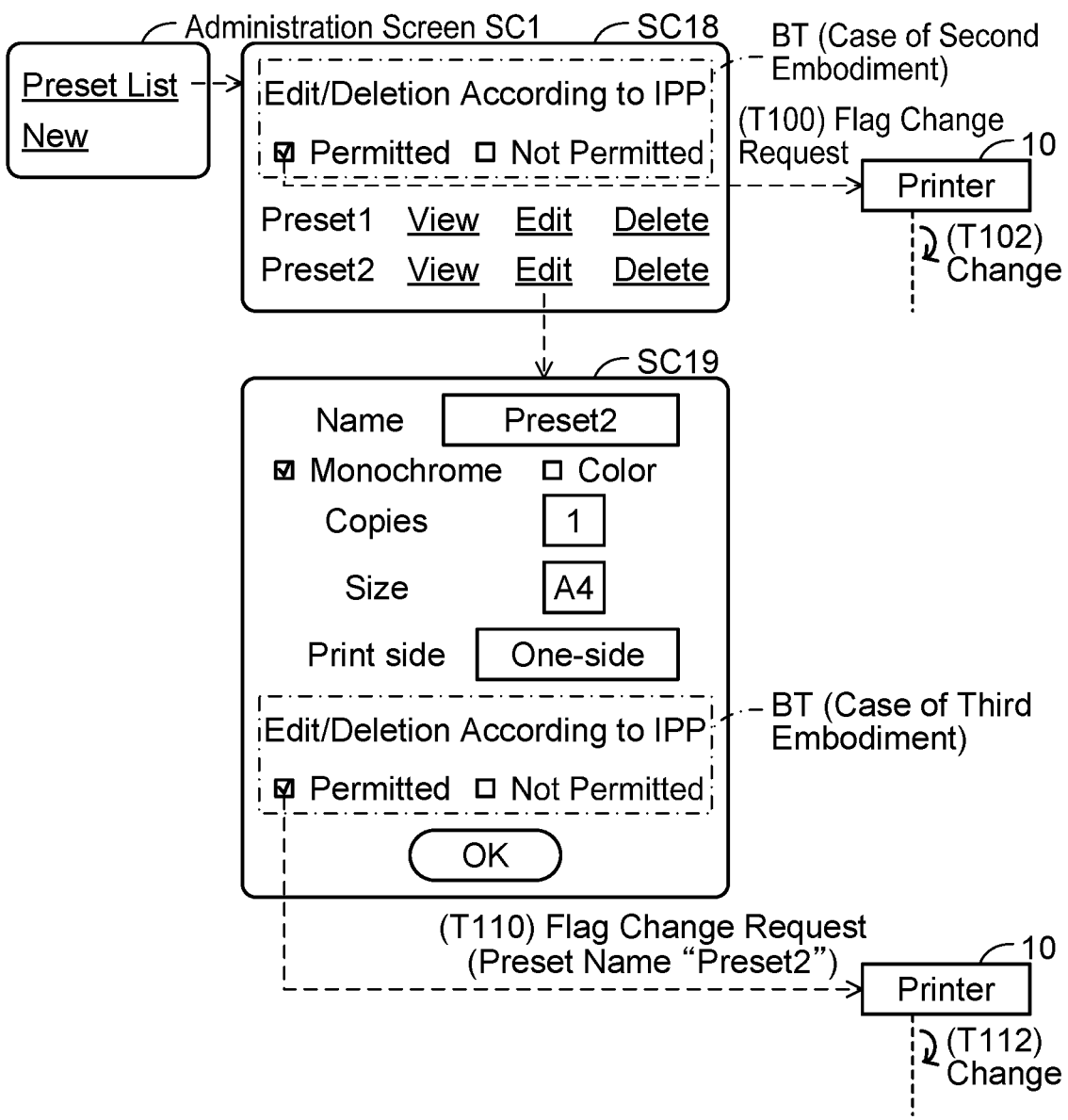
FIG. 5 illustrates an administration screen according to second and third embodiments.

(Process for Managing Preset Data; FIGS. 2 and 5)

A process for managing the preset data will be described with reference to FIGS. 2 and 5. The process of this embodiment is the same as that of the first embodiment except that the contents of the list screen are different. A list screen SC18 of FIG. 5 is a list screen displayed in the situation where the user of the administration terminal 100 is authenticated as the administrator. In this embodiment, the list screen displayed in the situation where the user of the administration terminal 100 is not authenticated as the administrator is the same as in the first embodiment.

The list screen SC18 includes a button BT for inputting an instruction to change the permission flag in addition to the preset name, the "View" button, the "Edit" button, and the "Delete" button. In the case in which the instruction to change the permission flag (for example, an instruction to change from "OFF" to "ON") is inputted on the button BT in the list screen SC18, the administration terminal 100 sends to the printer 10 a flag change request requesting changing of the permission flag according to the instruction in T100. Thereby, the printer 10 changes the permission flag in the memory 34 in accordance with the flag change request received from the administration terminal 100 in T102. In this embodiment, the screen displayed when the "View" button, the "Edit" button, and the "Delete" button in the list screen SC18 is selected is the same as in the first embodiment.

Figure 6:
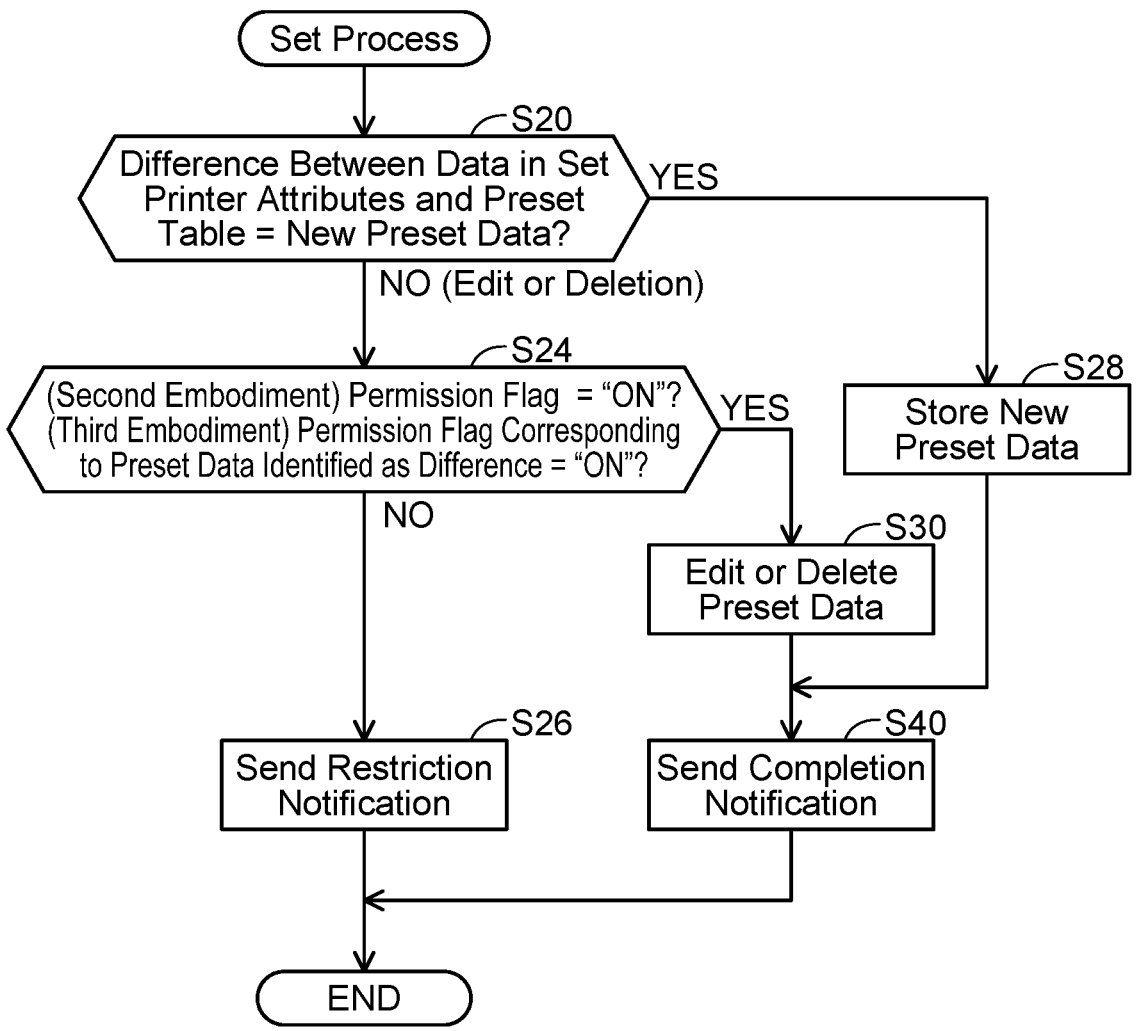
FIG. 6 illustrates a flowchart of a Set process according to the second and third embodiments.

(Set Process; FIG. 6)

Referring to FIG. 6, a Set process according to the present embodiment will be described. S20 is the same as S2 in FIG. 4. When determining that the identified difference is new preset data (YES in S20), the CPU 32 proceeds to S28. S28 and S40 following S28 are the same as S8 and S10 in FIG. 4, respectively. When the process of S40 ends, the process of FIG. 6 ends.

When determining that the identified difference is not the new preset data (NO in S20), that is, when the identified difference indicates one of the edit and deletion of the preset data, the CPU 32 proceeds to S24. In S24, the CPU 32 determines whether the permission flag in the memory 34 indicates "ON". When determining that the permission flag indicates "ON" (YES in S24), the CPU 32 proceeds to S30.

In S30, the CPU 32 executes the one of edit and deletion of the preset data in the preset table 42 based on the preset data in the SPA. For example, when the identified difference indicates the edit of the preset data, the CPU 32 changes the setting value of the particular setting item of the preset data in the preset table 42 corresponding to the identified difference to the setting value of the particular setting item of the edited preset data in the SPA corresponding to the identified difference. Thereby, the preset data in the preset table 42 is edited. In addition, for example, when the identified difference indicates the deletion of the preset data, the CPU 32 deletes, from the preset table 42, the preset data corresponding to the identified difference. When S30 ends, the process proceeds to S40.

When determining that the permission flag indicates "OFF" (NO in S24), the CPU 32 proceeds to S26. S26 is the same as S6 of FIG. 4. When S26 ends, the process of FIG. 6 ends.

According to such a configuration, the administrator can permit the general user to edit and delete the preset data by inputting the instruction to change the permission flag from "OFF" to "ON" on the button BT in the list screen SC18. In addition, the general user can perform the edit and deletion of the preset data by obtaining the permission from the administrator. Greater convenience for the administrator and the general user can be provided.

In addition, according to such a configuration, even when the permission flag indicates "OFF", the printer 10 stores the new preset data based on the preset data in the SPA (S28 in FIG. 6). Thereby, the general user can perform the storage of the new preset data without obtaining the permission from the administrator. Greater convenience for the general user can be provided. In a variant, when the permission flag indicates "OFF", the printer 10 may restrict the storage of the new preset data based on the preset data in the SPA. In this variant, the administrator can restrict the storage of the preset data by the general user by changing the permission flag to "OFF". Greater convenience for the administrator can be provided.

(Corresponding Relationships)

The permission flag "ON" and the permission flag "OFF" are an example of "first flag value" and "second flag value", respectively.

(Third Embodiment)

The permission flag of the second embodiment is a flag shared by all the preset data in the preset table 42. Contrary to this, each permission flag of the third embodiment is a flag used for corresponding one of all the pieces of preset data in the preset table 42.

(Configuration of Printer 10; FIG. 1)

The printer 10 of the present embodiment is the same as the printer 10 of the second embodiment except that the permission flag is stored in the preset table 42. As illustrated in FIG. 1, the preset table 42 stores one or more pieces of preset data and stores one permission flag in association with one piece of preset data. In a variant, the one permission flag may be a flag for permitting only the edit of the preset data, or may be a flag for permitting only the deletion of the preset data alone. In another variant, the preset table 42 may store two permission flags in association with one piece of preset data. The two permission flags are a first permission flag for permitting edit of corresponding preset data and a second permission flag for permitting deletion of the corresponding preset data. Further, in another variant, the printer 10 may store a third permission flag for permitting storage of new preset data in addition to the permission flag in the preset table 42.

(Process for Managing Preset; FIGS. 2 and 5)

The present embodiment is the same as the second embodiment except primarily that a screen where a button for inputting an instruction to change the permission flag is included is different. In this embodiment, the button BT for inputting the instruction to change the permission flag is not included in the list screen SC18, but is included in an edit screen SC19 displayed when the "Edit" button in the list screen SC18 is selected.

When an instruction to change the permission flag (for example, an instruction to change the permission flag from "OFF" to "ON") is inputted to the button BT in the edit screen SC19, the managing terminal 100 sends to the printer 10 a flag change request including a preset name (for example, "Preset2") corresponding to the selected "Edit" button in T110. Thereby, in T112, the printer 10 identifies from the preset table 42 the permission flag stored in association with the preset name in the flag change request, and changes the identified permission flag according to the flag change request.

(Set Process; FIG. 6)

The Set process of the present embodiment is the same as that of the second embodiment except that the contents of the process in S24 are different.

In S24, the CPU 32 identifies from the preset table 42 the preset data corresponding to the identified difference. Then, the CPU 32 determines whether the permission flag (hereinafter, referred to as "target permission flag") stored in the preset table 42 in association with the identified preset data indicates "ON". When determining that the target permission flag indicates "ON" (YES in S24), the CPU 32 proceeds to S30, while proceeds to S26 when determining that the target permission flag indicates "OFF" (NO in S24).

According to such a configuration, for example, the administrator can set the permission flag corresponding to the preset data PD1 identified by the preset name "Preset1" to "ON" and set the permission flag corresponding to the preset data PD2 identified by the preset name "Preset2" to "OFF" (see FIG. 1). That is, the administrator permits the edit and deletion of the preset data PD1, but does not permit the edit or deletion of the preset data PD2 that is different from the preset data PD1. The administrator can individually administrate the edit and deletion of the preset data. Greater convenience for the administrator can be provided.

(Fourth Embodiment)

(Configuration of Printer 10; FIGS. 1 and 7)

In a fourth embodiment, an account name assigned to the general user is used. The printer 10 of the present embodiment is the same as the printer 10 of the first embodiment except that the contents of the preset table 42 are different, an account table 44 is stored in the memory 34, and the contents of the Set process are different.

As illustrated in FIG. 7, the preset table 42 of the present embodiment can store the preset data in association with an account name and can store the preset data without associating with an account name. For example, the preset data PD1 identified by the preset name "Preset1" is stored in the preset table 42 in association with an account name "name1". In addition, for example, the preset data PD3 identified by the preset name "Preset3" is not associated with any account name. In the following, preset data stored in association with a specific account name is referred to as "account preset data", and preset data that is not associated with any account name is referred to as "shared preset data". The account preset data is preset data that is available only to an individual user indicated by the account name. The shared preset data is preset data available to any user.

The account table 44 stores, for each of the plurality of individual users, an account name (e.g., "name1") assigned to the individual user and a password (e.g., "yyyy") for authenticating the individual user in association with each other.

Figure 8:
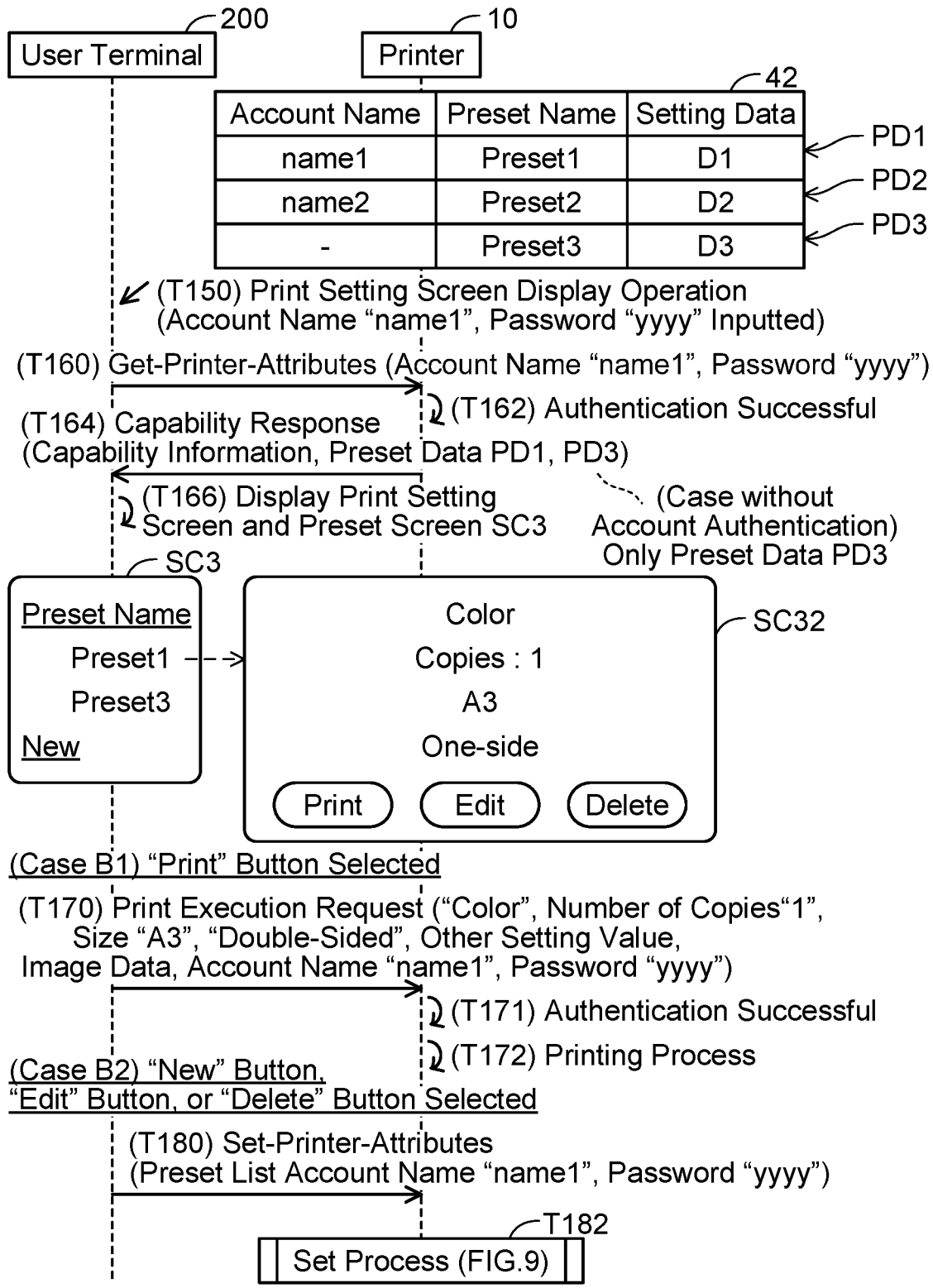
FIG. 8 illustrates a sequence diagram of a process for a user to use preset data in the fourth embodiment.

(Process for User to Use Preset; FIG. 8)

Referring to FIG. 8, in the present embodiment, a process for the general user to use the preset data will be described. In the initial state of FIG. 8, two pieces of account preset data PD1, PD2 and one piece of shared preset data PD3 are stored in the preset table 42.

T150 is the same as T50 of FIG. 3 except that the user terminal 200 can accept input of the account name "name1" and the password "yyyy" assigned to the general user from the general user. T160 is the same as T60 in FIG. 3 except that the GPA includes the account name "name1" and the password "yyyy."

When receiving the GPA from the user terminal 200 in T160, the printer 10 executes authentication of the account name "name1" included in the GPA in T162. In this case, the password "yyyy" stored in the account table 44 in association with the account name "name1" included in the GPA matches the password "yyyy" included in the GPA, the authentication of the account name "name1" included in the GPA succeeds. Then, the printer 10 executes the processes from T164. When the authentication of the account name "name1" included in the GPA fails, the printer 10 sends to the user terminal 200 a notification indicating that the authentication has failed, without executing the processes from T164.

In T164, the printer 10 identifies from the preset table 42 the account preset data PD1 stored in association with the account name "name1". Then, the printer 10 sends to the user terminal 200 a capability response including capability information, the identified account preset data PD1, and the shared preset data PD3. That is, the capability response includes the account preset data PD1 and the shared preset data PD3 and does not include the account preset data PD2 stored in association with the account name "name2" different from the account name "name1". That is, the individual user indicated by the account name "name1" cannot use the preset data PD2 that is available only to the individual user indicated by the account name "name2".

T166 is the same as T66 of FIG. 3 except that the preset screen SC3 includes the preset names "Preset1" and "Preset3". For example, when the preset name "Preset1" in the preset screen SC3 is selected, the user terminal 200 displays a print screen SC32. Case B1 is a case in which the "Print" button in the print screen SC32 is selected. T170 of Case B1 is the same as T70 of FIG. 3 except that the print execution request includes four setting values (i.e., number of colors "color", number of copies "1", size "A3", and sides to be printed "one-sided"), the account name "name1", and the password "yyyy" indicated by the preset data PD1.

When receiving the print execution request from the user terminal 200 in T170, the printer 10 uses the password "yyyy" included in the print execution request to authenticate the account name "name1" included in the print execution request in T171. In the present case, the authentication succeeds, and the printer 10 proceeds to T172. T172 is the same as T72 of FIG. 3. When the authentication of the account name "name1" included in the print execution request fails, the printer 10 sends to the user terminal 200 a notification indicating that the authentication has failed, without executing the process of T172.

Case B2 is the case in which one of the "New" button in the preset screen SC3, the "Edit" button, and the "Delete" button in the print screen SC32 is selected. T180 of Case B2 is the same as T80 of FIG. 3 except that the SPA includes the account name "name1" and the password "yyyy."

When receiving the SPA from the user terminal 200 in T180, the printer 10 executes a Set process (see FIG. 9) in T182. When the Set process ends, the process of FIG. 8 ends.

Figure 9:
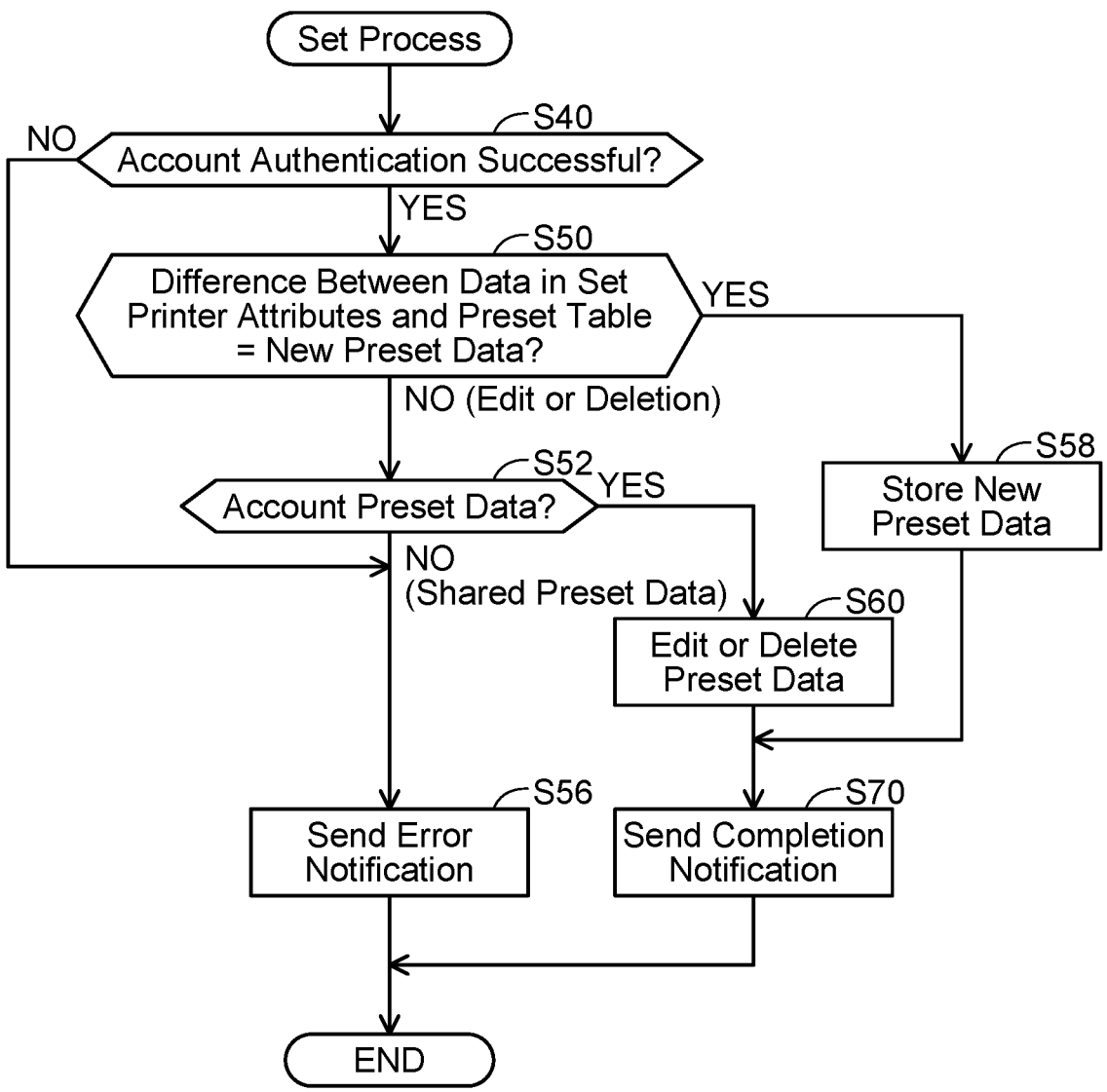
FIG. 9 illustrates a flowchart of a Set process according to the fourth embodiment.

(Set Process; FIG. 9)

Referring to FIG. 9, the Set process of T182 of FIG. 8 will be described. In S40, the CPU 32 uses the password included in the SPA to authenticate the account name included in the SPA. When authentication of the account name included in the SPA fails (NO in S40), the CPU 32 proceeds to S56. In S56, the CPU 32 sends to the user terminal 200 an error notification indicating that the process according to the SPA has not been executed due to the authentication failure. When S56 ends, the process of FIG. 9 ends.

When the authentication of the account name included in the SPA succeeds (YES in S40), the CPU 32 proceeds to S50. S50 is the same as S2 of FIG. 4 except that the preset data in the SPA is compared with the account preset data and the shared preset data stored in the preset table 42 in association with the account name included in the SPA. When determining that the identified difference is new preset data (YES in S50), the CPU 32 proceeds to S58.

In S58, the CPU 32 stores the new preset data in the SPA in the preset table 42 in association with the account name included in the SPA. That is, the CPU 32 stores the new preset data in the SPAs as account preset data in the preset table 42. For example, a comparative case is assumed in which the preset data in the SPA is stored as the shared preset data. In this case, the shared preset data (i.e., preset data to be administered by the administrator) that is available to any user may be added without the administrator knowing. On the other hand, in the present embodiment, account preset data (i.e., preset data to be administered by an individual user) that is available only to the individual user alone is added. The effort of the administrator to administer the shared preset data can be reduced. In a variant, the configuration of the above-described comparative example may be employed.

The CPU 32 proceeds to S52 when determining that the identified difference indicates one of edit and deletion of the preset data (NO in S50). In S52, the CPU 32 determines whether the preset name of the preset data corresponding to the identified difference matches any one of the preset names of the account preset data in the preset table 42. If the CPU 32 determines that the preset data corresponding to the identified difference is the account preset data due to this preset name of his preset data matching any one of the preset names of the account preset data (YES in S52), the CPU 32 proceeds to S60. S60 is the same as S30 in FIG. 6.

When S58 or S60 ends, the CPU 32 proceeds to S70. S70 is the same as S10 in FIG. 4. When S70 ends, the process of FIG. 9 ends.

Further, the CPU 32 proceeds to S56 when determining that the preset data corresponding to the identified difference is the shared preset data (NO in S52) due to this preset name of this preset data not matching any of the preset names of the account preset data. In S56 executed after the determination of NO in S52, the CPU 32 sends an error notification to the user terminal 200 indicating that the process according to the SPA has not been executed due to the preset data corresponding to the identified difference being the shared preset data.

According to this configuration, when the preset data in the SPA indicates one of the edit and deletion of the account preset data, the printer 10 executes the one of the edit and deletion of the account preset data (S50) (NO in S50 and YES in S52). On the other hand, when the preset data in the SPA indicates one of the edit and deletion of the shared preset data, the printer 10 restricts the one of the edit and deletion of the shared preset data (NO in S50 and NO in S52). As described above, the shared preset data is available to any user. Therefore, if the shared preset data is edited or deleted without the administrator and other individual users knowing, the administrator and the other individual users may feel inconvenient. In this embodiment, since the shared preset data is not edited or deleted, it is possible to prevent the administrator and the other individual users from feeling inconvenient.

(Corresponding Relationships)

The shared preset data and the account preset data are an example of "first type of setting data" and "second type of setting data", respectively.

T164, T170, T172 of FIG. 8 are an example of the process implemented by "send to the terminal device one or more pieces of setting data", "receive from the terminal device a process execution request", and "cause the image processing execution unit to execute the image processing", respectively.

(Fifth Embodiment)

The present embodiment is the same as the first embodiment except that a restriction request is sent to the user terminal 200 instead of execution of the Set process, and that the process according to the restriction request is executed at the user terminal 200. The restriction request is a command that restricts sending of the SPA requesting edit and deletion of the preset data.

Figure 10:
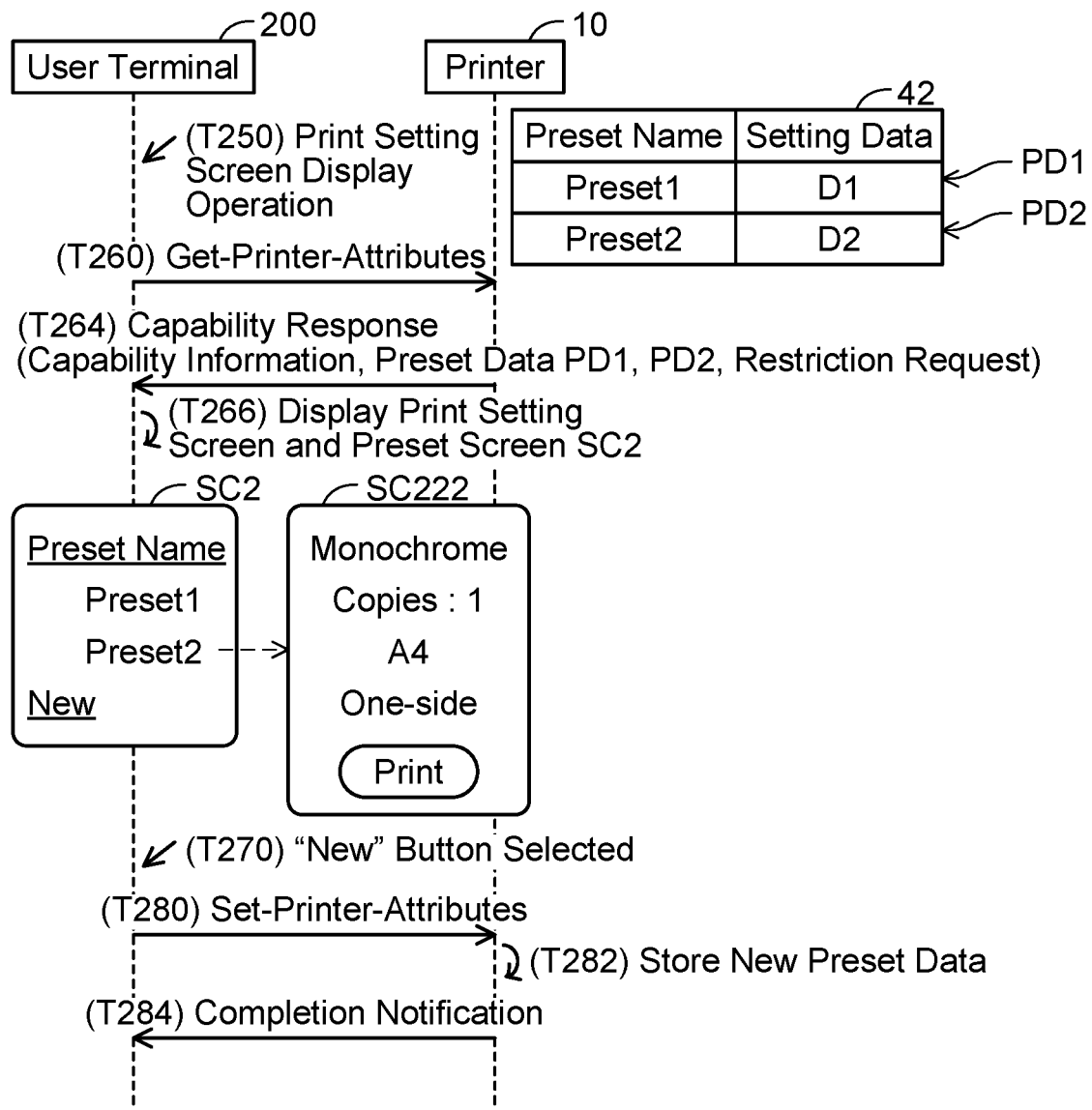
FIG. 10 illustrates a sequence diagram of a process for a user to use preset data in a fifth embodiment.

(Process for User to Use Preset Data; FIG. 10)

The initial state of FIG. 10 is the same as the initial state of FIG. 3 of the first embodiment. T250 and T260 are the same as T50 and T60, respectively. T264 is the same as T64 except that the capability response further includes the restriction request. T266 is the same as T66.

For example, when the preset name "Preset 2" in the preset screen SC2 is selected, the user terminal 200 displays a print screen SC222 according to the restriction request in T264. The print screen SC222 is the same as SC22 of FIG. 3 except that the print screen SC222 includes neither the "Edit" button nor the "Delete" button. When the preset name "Preset 1" in the preset screen SC2 is selected as well, the user terminal 200 displays a print screen including neither the "Edit" button nor the "Delete" button, although the illustration thereof is omitted. In other words, the edit and deletion of the preset data PD1, PD2 are restricted. In a variant, in the print screen SC222, both of the "Edit" button and the "Delete" button may be displayed such that they cannot be selected (e.g., gray-scaled).

In T270, the user selects the "New" button in the preset screen SC2. The subsequent T280 is the same as T80 of FIG. 3. In T282, the printer 10 stores, in the preset table 42, the new preset data in the SPA in T280 (see S8 of FIG. 4). In T284, the printer 10 sends a completion notification to the user terminal 200 (see S10 of FIG. 4).

According to the configuration of the present embodiment, by sending the restriction request to the user terminal 200, the printer 10 can restrict the sending of the SPA requesting the edit and deletion among the sending of the SPA by the user terminal 200. Due to this, the edit and deletion of the preset data can be restricted. In a variant, the printer 10 may restrict the sending of all the SPA by the user terminal 200. In the present variant, the restriction request may be a command restricting the sending of all the SPA, and for example, the user terminal 200 may display the preset screen SC2 that does not include the "New" button according to this restriction request.

In another variant, the restriction request may be a command which restricts the edit and deletion of the preset data PD2 but does not restrict the edit or deletion of the preset data PD1. In the present variant, when the preset name "Preset 1" in the preset screen SC2 is selected, the user terminal 200 may display the print screen including the "Edit" button and the "Delete" button. For example, preset data of which edit and deletion are restricted by the restriction request may be selected by the administrator.

(Corresponding Relationships)

T264 of FIG. 10 is an example of the process implemented by "send to the terminal device a restriction request". In a variant, the restriction request may be sent to the user terminal 200 as a signal different from the capability response. In the present variant, sending this different signal to the user terminal 200 is an example of the process implemented by "send to the terminal device a restriction request".

(Sixth Embodiment)

The present embodiment is the same as the fourth embodiment except that a partial restriction request is sent to the user terminal 200 instead of execution of the Set process, and that the process according to the partial restriction request is executed at the user terminal 200. The partial restriction request is a command that restricts sending of the SPA requesting edit and deletion of the shared preset data but does not restrict sending of the SPA requesting edit and deletion of the account preset data.

Figure 11:
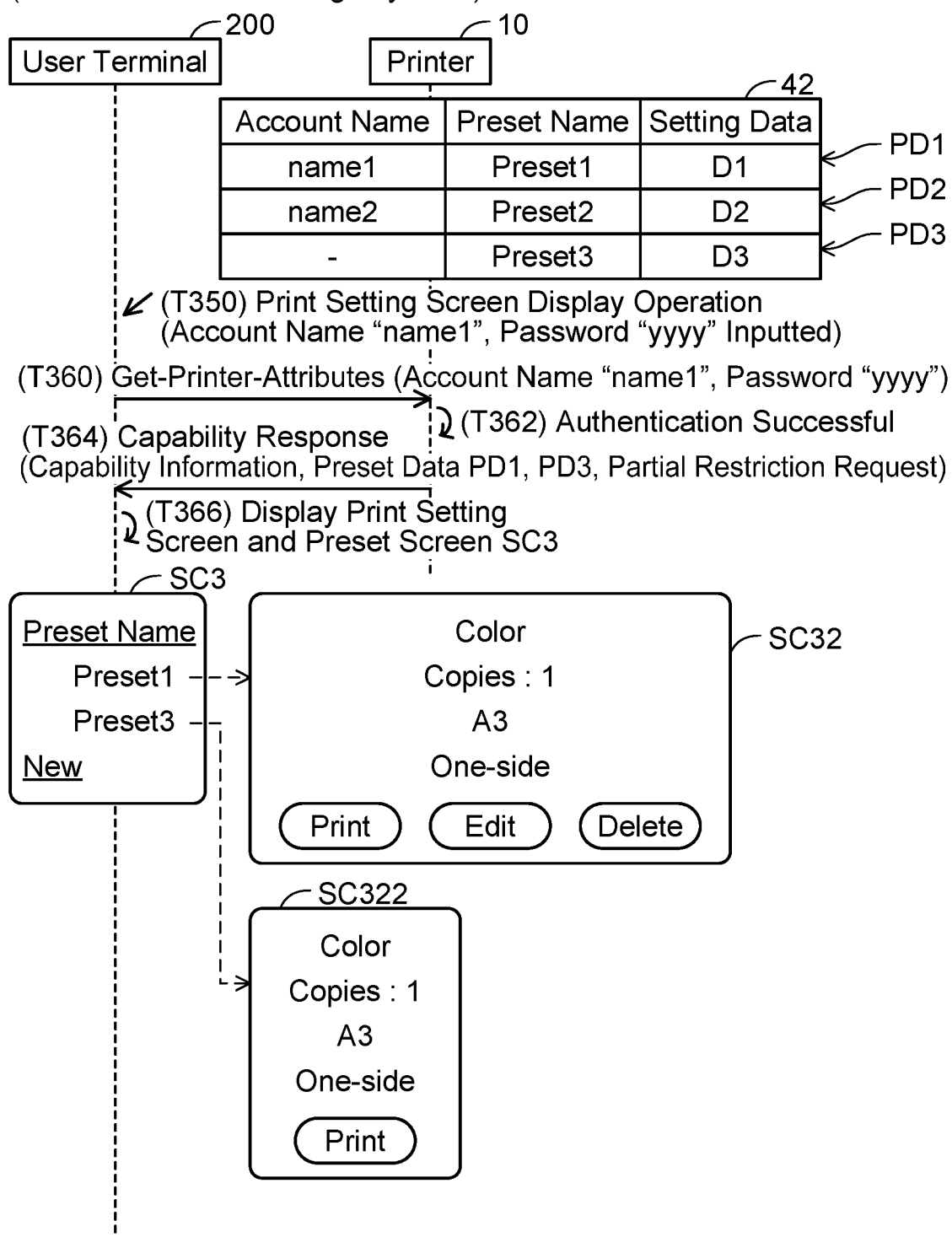
FIG. 11 illustrates a sequence diagram of a process for a user to use preset data in a sixth embodiment.

(Process for User to Use Preset Data; FIG. 11)

The initial state of FIG. 11 is the same as the initial state of FIG. 8 of the fourth embodiment. T350 to T362 are the same as T150 to T162 of FIG. 8. T364 is the same as T164 except that the capability response includes the partial restriction request. T366 is the same as T166.

For example, when the preset name "Preset 1" in the preset screen SC3 is selected, the user terminal 200 displays the print screen SC32 including the "Edit" button and the "Delete" button. For example, when one of the "Edit" button and the "Delete" button is selected, the user terminal 200 sends the SPA as with T180 of FIG. 8. Due to this, according to the SPA, the printer 10 executes the edit or deletion of the account preset data PD1 indicated by the preset name "Preset1".

In addition, for example, when the preset name "Preset 3" in the preset screen SC3 is selected, the user terminal 200 displays a print screen SC332 including neither the "Edit" button nor the "Delete" button according to the partial restriction request in T364. In other words, the edit and deletion of the shared preset data PD3 are restricted. In a variant, in the print screen SC332, both of the "Edit" button and the "Delete" button may be displayed such that they cannot be selected (e.g., gray-scaled).

According to the configuration of the present embodiment, by sending the partial restriction request to the user terminal 200, the printer 10 can restrict the sending of the SPA requesting the edit and deletion of the shared preset data among the sending of the SPA by the user terminal 200. Due to this, the edit and deletion of the shared preset data can be restricted. As with the fourth embodiment, the edit and deletion of the account preset data are not restricted in the present embodiment, however, the edit and deletion of the shared preset data are restricted. It is possible to prevent the administrator and the other individual users from feeling inconvenient due to the shared preset data being edited or deleted without the administrator and the other individual users knowing. T364 of FIG. 11 is an example of the process implemented by "send to the terminal device a restriction request".

(First Variant)

"Image processing" is not limited to the printing process, and may be, for example, a scanning process. "Image processing execution unit" is not limited to the print execution unit 16, and may be, for example, a scanning mechanism such as a CCD or a CIS. In this case, "setting data" includes a plurality of setting values corresponding to a plurality of setting items (e.g., image quality, data format, size, etc.) for executing the scanning process.

(Second Variant)

The preset table 42 may be stored in, not limited to the memory 34 of the printer 10, a predetermined area in a storage device (for example, an external memory, a server, or the like) that is provided separately from the printer 10. In the present variant, the predetermined area in the storage device is an example of "setting storage area".

(Third Variant)

In the first embodiment, the printer 10 executes the storage of the new preset data based on the preset data in the SPA (S8 in FIG. 4), and restricts the edit and deletion of the preset data based on the preset data in the SPA (S6). Alternatively, the printer 10 may restrict not only the edit and deletion of the preset data, but also the storage of new preset data. In this modification, restricting any of the edit, deletion, and storage of the preset data is an example of "changing according to the second type of changing request is restricted".

(Fourth Variant)

The processes of S6 in FIG. 4, S26 in FIG. 6, and S56 in FIG. 9 may not be executed. In this variant, "send to the terminal device a notification" can be omitted.

(Fifth Variant)

In the fourth embodiment, the printer 10 stores the new preset data in the SPA as the account preset data (S58). Alternatively, the printer 10 may restrict the storage of the new preset data in the SPA. In this variant, "store the new setting data in the setting storage area" can be omitted.

(Sixth Variant)

In each of the above-described embodiments, when the authentication using the administration password "xxxx" is successful, the preset data is edited or deleted (SC12 in FIG. 2). Alternatively, the preset data may be edited or deleted even if the authentication using the administration password "xxxx" is not executed. In the present variant the authentication of "a user of the terminal device is a user who has authority to change settings of the image processing device" can be omitted.

(Seventh Variant)

In each of the above-described embodiments, the HTTP request of T16 of FIG. 2 includes the administration password "xxxx." Alternatively, the HTTP request of T34 may include the administration password "xxxx".

(Eighth Variant)

"First type of changing request" is not limited to a signal according to a protocol for utilizing a web server function (e.g., HTTP), but it may be, for example, a signal according to the Simple Network Management Protocol (SNMP).

(Ninth Variant)

"Second type of changing request" is not limited to a signal according to IPP, but it may be, for example, a signal according to a protocol for utilizing setting data stored in the printer 10 and different from the IPP.

(Tenth Variant)

"Specific information" is not limited to the one or more setting values indicated by the preset data, and may be for example the preset name indicating the preset data.

(Eleventh Variant)

In each of the above embodiments, respective processes of FIGS. 2 to 9 are implemented by software (e.g., program 40), but at least one of these processes may be implemented by hardware such as a logic circuit.

What is claimed is:

1. An image processing device comprising:
an image processing execution unit configured to execute image processing; and
a controller,
wherein the controller is configured to:
in a case where an obtainment request is received from a terminal device, send to the terminal device one or more pieces of setting data stored in a setting storage area for storing the one or more pieces of setting data related to the image processing;
in a case where specific setting data is selected from among the one or more pieces of setting data on the terminal device after the one or more pieces of setting data have been sent to the terminal device, receive from the terminal device a process execution request including specific information for specifying the specific setting data;
in a case where the process execution request is received from the terminal device, cause the image processing execution unit to execute the image processing according to the one or more setting values indicated by the specific setting data specified by the specific information included in the process execution request; and
in a case where a first type of changing request requesting changing of stored contents in the setting storage area is received from the terminal device, change the stored contents in the setting storage area according to the first type of changing request, wherein in a case where a second type of changing request being different from the first type of changing request is received from the terminal device, changing according to the second type of changing request is restricted, the second type of changing request requesting changing of the stored contents in the setting storage area.

2. The image processing device as in claim 1, wherein
in a case where the second type of changing request requesting one of edit and deletion of the setting data in the setting storage area is received from the terminal device, the one of edit and deletion according to the second type of changing request is restricted, and
in a case where the second type of changing request requesting storage of new setting data in the setting storage area is received from the terminal device, changing according to the second type of changing request is not restricted.

3. The image processing device as in claim 1, wherein the controller is further configured to:
in a case where the second type of changing request is received from the terminal device, send to the terminal device a notification indicating that the changing according to the second type of changing request has been restricted.

4. The image processing device as in claim 1, wherein the controller is further configured to:
- store a permission flag in a memory, the permission flag indicating any one of a first flag value and a second flag value, the first flag value being for permitting the changing according to the second type of changing request, the second flag value being for not permitting the changing according to the second type of changing request; and
- in a case where the second type of changing request is received from the terminal device and the permission flag in the memory indicates the first flag value, change the stored contents in the setting storage area according to the second type of changing request, wherein in a case where the second type of changing request is received from the terminal device and the permission flag in the memory indicates the second flag value, the changing according to the second type of changing request is restricted.

5. The image processing device as in claim 4, wherein the setting storage area is an area for storing a plurality of pieces of setting data related to the image processing, and
the permission flag is shared by the plurality of pieces of setting data.

6. The image processing device as in claim 4, wherein the setting storage area is an area for storing a plurality of pieces of setting data related to the image processing, and
the permission flag indicating the first flag value is capable of being stored in the memory in association with first setting data among the plurality of pieces of setting data,
the permission flag indicating the second flag value is capable of being stored in the memory in association with second setting data among the plurality of pieces of setting data, the second setting data being different from the first setting data,
in a case where the second type of changing request requesting one of edit and deletion of the first setting data is received from the terminal device in a situation where the permission flag indicating the first flag value is stored in the memory in association with the first setting data, the one of edit and deletion of the first setting data is executed, and
in a case where the second type of changing request requesting one of edit and deletion of the second setting data is received from the terminal device in a situation where the permission flag indicating the second flag value is stored in the memory in association with the second setting data, the one of edit and deletion of the second setting data is restricted.

7. The image processing device as in claim 1, wherein each of the one or more pieces of setting data is first type of setting data available to any user.

8. The image processing device as in claim 7, wherein the setting storage area is an area for storing a plurality of pieces of setting data related to the image processing, the plurality of pieces of setting data includes the first type of setting data and second type of setting data available only to an individual user, and
the controller is configured to;
- in a case where the obtainment request including user information indicating a specific user is received from the terminal device, send to the terminal device the first type of setting data and the second type of setting data available only to the specific user; and
- in a case where the obtainment request not including the user information is received from the terminal device, send to the terminal device the first type of setting data without sending, to the terminal device, the second type of setting data available only to the specific user.

9. The image processing device as in claim 8, wherein the controller is further configured to;
- in a case where the second type of changing request requesting one of edit and deletion of the second type of setting data is received from the terminal device, execute the one of edit and deletion of the second type of setting data, and
- in a case where the second type of changing request requesting one of edit and deletion of the first type of setting data is received from the terminal device, the one of edit and deletion of the first type of setting data is restricted.

10. The image processing device as in claim 8, wherein the controller is further configured to;
- in a case where the second type of changing request requesting storage of new setting data in the setting storage area is received from the terminal device, store the new setting data in the setting storage area as the second type of setting data.

11. The image processing device as in claim 1, wherein
in a case where it is authenticated that a user of the terminal device is a user who has authority to change settings of the image processing device and the first type of changing request is received from the terminal device, the stored contents in the setting storage area is changed according to the first type of changing request, and
in a case where it is not authenticated that the user of the terminal device is the user who has the authority to change the settings of the image processing device and the first type of changing request is received from the terminal device, changing according to the first type of changing request is restricted.

12. The image processing device as in claim 11, wherein
in the case where it is not authenticated that the user of the terminal device is the user who has the authority to change the settings of the image processing device, changing according to the second type of changing request requesting one of edit and deletion of the setting data in the setting storage area is restricted, and
in the case where it is not authenticated that the user of the terminal device is the user who has the authority to change the settings of the image processing device, the changing according the second type of changing request requesting storage of new setting data in the setting storage area is not restricted.

13. The image processing device as in claim 1, wherein the image processing device includes a web server function, and
the first type of changing request is a signal according to a protocol for using the web server function.

14. The image processing device as in claim 1, wherein the second type of changing request is a signal according to the Internet Printing Protocol (IPP).

15. A non-transitory computer-readable recording medium storing computer-readable instructions for an image processing device, wherein
the image processing device comprising:
- an image processing execution unit configured to execute image processing; and
- a processor, wherein the computer-readable instructions, when executed by the processor, cause the image processing device to:
- in a case where an obtainment request is received from a terminal device, send to the terminal device one or more pieces of setting data stored in a setting storage area for storing the one or more pieces of setting data related to the image processing;
- in a case where specific setting data is selected from among the one or more pieces of setting data on the terminal device after the one or more pieces of setting data have been sent to the terminal device, receive from the terminal device a process execution request including specific information for specifying the specific setting data;
- in a case where the process execution request is received from the terminal device, cause the image processing execution unit to execute the image processing according to the one or more setting values indicated by the specific setting data specified by the specific information included in the process execution request; and
- in a case where a first type of changing request requesting changing of stored contents in the setting storage area is received from the terminal device, change the stored contents in the setting storage area according to the first type of changing request, wherein in a case where a second type of changing request being different from the first type of changing request is received from the terminal device, changing according to the second type of changing request is restricted, the second type of changing request requesting changing of the stored contents in the setting storage area.

16. An image processing device comprising:
an image processing execution unit configured to execute image processing; and
a controller,
wherein the controller is configured to:
- in a case where an obtainment request is received from a terminal device, send to the terminal device one or more pieces of setting data stored in a setting storage area for storing the one or more pieces of setting data related to the image processing;
- in a case where specific setting data is selected from among the one or more pieces of setting data on the terminal device after the one or more pieces of setting data have been sent to the terminal device, receive from the terminal device a process execution request including specific information for specifying the specific setting data;
- in a case where the process execution request is received from the terminal device, cause the image processing execution unit to execute the image processing according to the one or more setting values indicated by the specific setting data specified by the specific information included in the process execution request; and
- in a case where a first type of changing request requesting changing of stored contents in the setting storage area is received from the terminal device, change the stored contents in the setting storage area according to the first type of changing request, and
send to the terminal device a restriction request requesting restriction of sending of a second type of changing request being different from the first type of changing request, the second type of changing request requesting changing of the stored contents in the setting storage area.

17. A non-transitory computer-readable recording medium storing computer-readable instructions for an image processing device, wherein
the image processing device comprising:
an image processing execution unit configured to execute image processing; and
a processor,
wherein the computer-readable instructions, when executed by the processor, cause the image processing device to:
- in a case where an obtainment request is received from a terminal device, send to the terminal device one or more pieces of setting data stored in a setting storage area for storing the one or more pieces of setting data related to the image processing;
- in a case where specific setting data is selected from among the one or more pieces of setting data on the terminal device after the one or more pieces of setting data have been sent to the terminal device, receive from the terminal device a process execution request including specific information for specifying the specific setting data;
- in a case where the process execution request is received from the terminal device, cause the image processing execution unit to execute the image processing according to the one or more setting values indicated by the specific setting data specified by the specific information included in the process execution request; and
- in a case where a first type of changing request requesting changing of stored contents in the setting storage area is received from the terminal device, change the stored contents in the setting storage area according to the first type of changing request, and
send to the terminal device a restriction request requesting restriction of sending of a second type of changing request being different from the first type of changing request, the second type of changing request requesting changing of the stored contents in the setting storage area.

* * * * *

UNITED STATES PATENT AND TRADEMARK OFFICE
CERTIFICATE OF CORRECTION

Page 1 of 1

PATENT NO. : 11,366,623 B2
APPLICATION NO. : 17/358397
DATED : June 21, 2022
INVENTOR(S) : Kohei Mori It is certified that error appears in the above-identified patent and that said Letters Patent is hereby corrected as shown below:

On the Title Page

Item (30) should read:
Jun. 26, 2020 (JP).................JP2020-110740
Jun. 09, 2021 (JP).................JP2021-096611

Signed and Sealed this
Twenty-fourth Day of January, 2023

Katherine Kelly Vidal
*Director of the United States Patent and Trademark Office*